(12) United States Patent
Benchenaa et al.

(10) Patent No.: US 9,576,077 B2
(45) Date of Patent: Feb. 21, 2017

(54) GENERATING AND DISPLAYING MEDIA CONTENT SEARCH RESULTS ON A COMPUTING DEVICE

(71) Applicant: Intel Corporation, Santa Clara, CA (US)

(72) Inventors: Hayat Benchenaa, London (GB); Daren P. Wilson, London (GB); Aras Bilgen, Hillsboro, OR (US); Dirk Hohndel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 489 days.

(21) Appl. No.: 13/729,344

(22) Filed: Dec. 28, 2012

(65) Prior Publication Data

US 2014/0188831 A1 Jul. 3, 2014

(51) Int. Cl.
*G06F 17/30* (2006.01)

(52) U.S. Cl.
CPC ... *G06F 17/30994* (2013.01); *G06F 17/30693* (2013.01)

(58) Field of Classification Search
None
See application file for complete search history.

(56) References Cited

U.S. PATENT DOCUMENTS

| | | | | |
|---|---|---|---|---|
| 6,209,103 B1* | 3/2001 | Schreiber | ............. | G06F 17/214 726/26 |
| 6,721,736 B1* | 4/2004 | Krug | ................ | G06F 17/30864 707/634 |
| 6,745,178 B1* | 6/2004 | Emens | ............. | G06F 17/30864 707/741 |
| 2002/0111847 A1* | 8/2002 | Smith, II | ............. | G06Q 30/02 705/7.31 |
| 2004/0064447 A1* | 4/2004 | Simske | ............ | G06F 17/30684 |
| 2004/0205051 A1* | 10/2004 | Kim | .................. | G06F 17/3069 |
| 2005/0091205 A1* | 4/2005 | Sidlosky et al. | .................. | 707/3 |
| 2007/0024594 A1* | 2/2007 | Sakata | ................. | G06F 3/0488 345/173 |
| 2009/0182736 A1 | 7/2009 | Ghatak | | |
| 2009/0217804 A1 | 9/2009 | Lu et al. | | |
| 2010/0023509 A1* | 1/2010 | Adachi | ............ | G06F 17/30864 707/E17.014 |
| 2010/0306249 A1* | 12/2010 | Hill et al. | ..................... | 707/769 |
| 2012/0117058 A1 | 5/2012 | Rubinstein et al. | | |
| 2012/0125178 A1 | 5/2012 | Cai et al. | | |

(Continued)

OTHER PUBLICATIONS

International Search Report and Written Opinion received for International Application No. PCT/US2013/077564, mailed Apr. 22, 2014, 12 pages.

*Primary Examiner* — Bai D. Vu
(74) *Attorney, Agent, or Firm* — Barnes & Thornburg LLP

(57) ABSTRACT

Technologies for generating and displaying media search results on a computing device include determining search criteria based on media stored and/or accessed on the computing device. One or more search queries are generated based on the search criteria and submitted to one or more search engines. Any search results are analyzed for relevancy to the media and/or user, and relevant search results are displayed on a display of the computing device. The user may select one or more of the displayed search results to access additional information, websites, and/or perform other functions related to the displayed search result.

29 Claims, 6 Drawing Sheets

(56) References Cited

U.S. PATENT DOCUMENTS

| | | | |
|---|---|---|---|
| 2012/0130812 A1 | 5/2012 | Ramer et al. | |
| 2012/0136849 A1* | 5/2012 | Niranjan | G06F 17/3087 707/708 |
| 2012/0221687 A1* | 8/2012 | Hunter et al. | 709/219 |
| 2012/0254223 A1* | 10/2012 | Jotanovic | G06F 17/30749 707/769 |
| 2012/0278244 A1* | 11/2012 | Lee | G06Q 50/184 705/310 |
| 2012/0323938 A1* | 12/2012 | Skeen | G06F 17/30752 707/754 |
| 2014/0181083 A1* | 6/2014 | Macho | G06F 17/30023 707/722 |

\* cited by examiner

GENERATING AND DISPLAYING MEDIA CONTENT SEARCH RESULTS ON A COMPUTING DEVICE

BACKGROUND

Computing devices are becoming ubiquitous tools for personal, business, and social uses. Many user's store vast amounts of media content on their computing devices. In fact, many user's store their media content libraries on mobile computing devices to allow them access to the media content at any time. Such media content may include, for example, music, e-books, videos, pictures, documents, games, podcasts, contacts, messages, mailing lists, appointments, to-do lists, various applications, recipes, Rich Site Summary (RSS) feeds, and other content. A user's collection of media content is generally indicative of their personal tastes and interests. Many users' media collections are not static; rather, the user will often add to and update their collection over time as their preferences and interests broaden and/or change.

Many users enjoy expanding and learning about their interests (e.g., learning about new artists or upcoming books). One way in which users learn more about their media content collections is through online searching. By using online search tools, user's may learn additional information about their tastes and interest, expand their interests and media collections, and receive updates related to their interests. For example, user's may periodically visit a music site to learn about any new releases or upcoming concerts by their favorite band. Many company websites and fansites are available for such purposes. Of course, such additional searching and information gathering consumes a significant amount of the user's time, which may have been better spent enjoying their media collection. Additionally, the very act of searching for such additional information and updates becomes increasing difficult as the user's media collection and tastes expand. Although some recommendation systems are available (e.g., those recommendation systems designed to recommend music similar to the user's taste), the resulting recommendations are often very narrow (e.g., simply another song that the user may like) and lack any additional or related information that may be of interest to the user.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
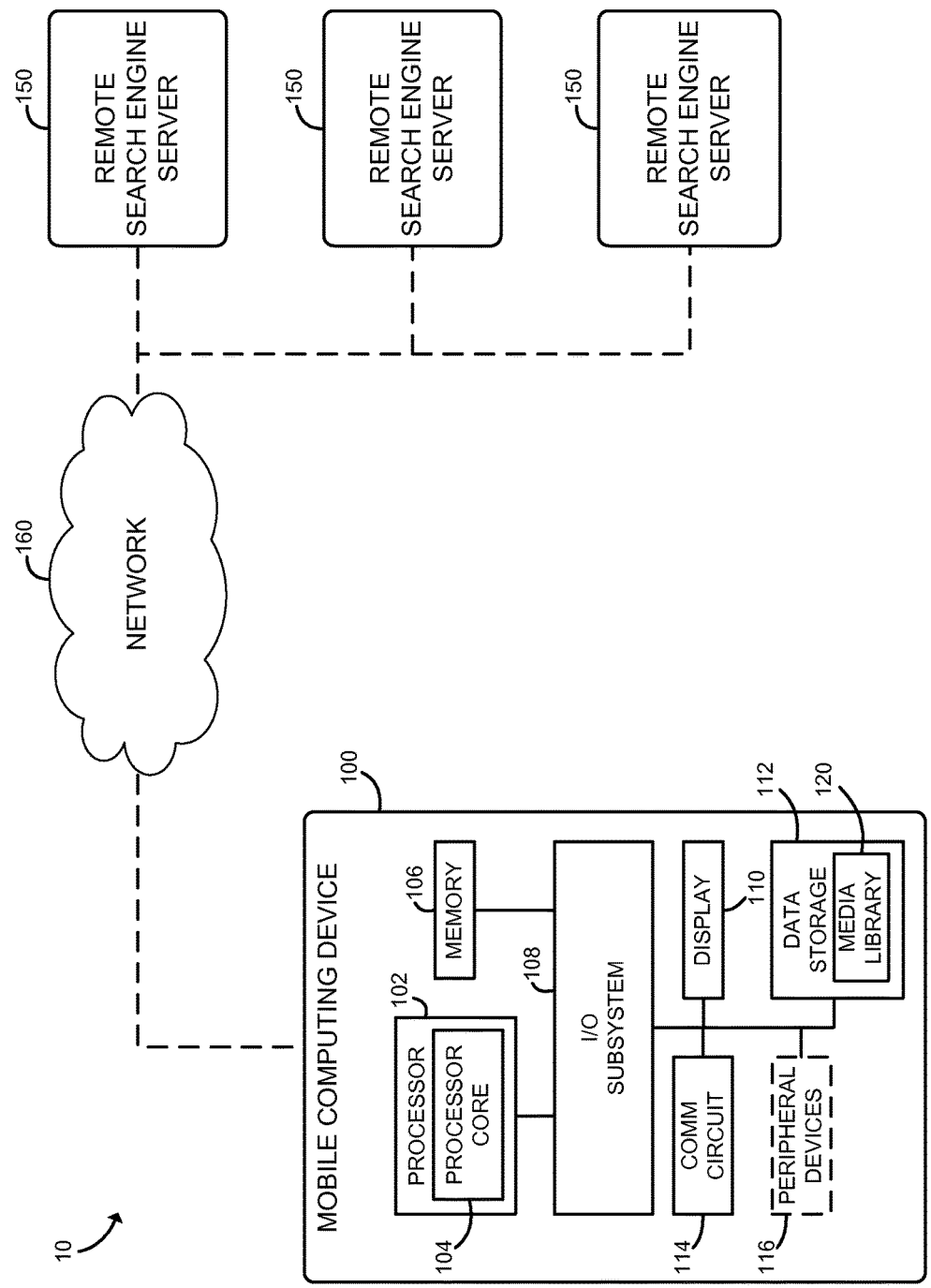
FIG. 1 is a simplified block diagram of at least one embodiment of a system for generating and displaying media search results on a computing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 10 for generating and displaying media search results includes a mobile computing device 100, one or more remote search engine severs 150, and a network 160 over which the mobile computing device 100 and remote search engine servers 150 communicate. As discussed in more detail below, the mobile computing device 100 is configured to analyze a user's media collection and/or the user's interaction with such media collection, generate a search query for related information, and display relevant search results to the user. The search query is generated in an automated manner (i.e., without direction from the user), and the search results may be displayed to the user while the user is interacting with the media. The search query may have a narrow and/or broad focus. For example, in some embodiments, the search query may be directly related to the media currently being consumed by the user (e.g., other songs by the same musical artist that the user is currently listening to) and/or tangentially related (e.g., concert dates of the artist that the user is listening to). Additionally multiple search queries may be generated and submitted to multiple remote search engine servers 150 to generate a large volume of search results, which are subsequently analyzed for relevancy to the consumed media as discussed in more detail below. The relevancy of the search results may be based on pre-defined or determined policy data, which may include the user's past media consumption habits, statistical information of the media collection in the user's media library, rankings provided by third-party sources, user-supplied policies, and/or the like. In this way, the user is presented with additional, relevant information regarding the media currently being consumed without the need to actively search for, and winnow, such additional information.

The mobile computing device 100 may be embodied as any type of mobile computing device capable of performing the functions described herein. For example, in some embodiments, the mobile computing device 100 may be embodied as a "smart" phone, a tablet computer, a mobile media device, and a game console, a mobile internet device (MID), a personal digital assistant, a laptop computer, a mobile appliance device, or other mobile computing device. As shown in FIG. 1, the illustrative mobile computing device 100 includes a processor 102, a memory 106, an input/output subsystem 108, and a display 110. Of course, the mobile computing device 100 may include other or additional components, such as those commonly found in a mobile computing device and/or communication device (e.g., various input/output devices), in other embodiments. Additionally, in some embodiments, one or more of the illustrative components may be incorporated in, or otherwise from a portion of, another component. For example, the memory 106, or portions thereof, may be incorporated in the processor 102 in some embodiments.

The processor 102 may be embodied as any type of processor capable of performing the functions described herein. For example, the processor may be embodied as a single or multi-core processor(s) having one or more processor cores 104, a digital signal processor, a microcontroller, or other processor or processing/controlling circuit. Similarly, the memory 106 may be embodied as any type of volatile or non-volatile memory or data storage currently known or developed in the future and capable of performing the functions described herein. In operation, the memory 106 may store various data and software used during operation of the mobile computing device 100 such as operating systems, applications, programs, libraries, and drivers. The memory 106 is communicatively coupled to the processor 102 via the I/O subsystem 108, which may be embodied as circuitry and/or components to facilitate input/output operations with the processor 102, the memory 106, and other components of the mobile computing device 100. For example, the I/O subsystem 108 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 108 may form a portion of a system-on-a-chip (SoC) and be incorporated, along with the processor 102, the memory 106, and other components of the mobile computing device 100, on a single integrated circuit chip.

The display 110 of the mobile computing device 100 may be embodied as any type of display on which information may be displayed to a user of the mobile computing device 100. For example, the display 110 may be embodied as, or otherwise use, any suitable display technology including, for example, a liquid crystal display (LCD), a light emitting diode (LED) display, a cathode ray tube (CRT) display, a plasma display, and/or other display usable in a mobile computing device. Additionally, in some embodiments, the display 110 may be embodied as a touchscreen display and include an associated touchscreen sensor (not shown) to receive tactile input and data entry from the user.

The mobile computing device 100 may also include a data storage 112. The data storage 112 may be embodied as any type of device or devices configured for the short-term or long-term storage of data such as, for example, memory devices and circuits, memory cards, hard disk drives, solid-state drives, or other data storage devices. In the illustrative embodiment, the mobile computing device 100 may store a media library 120 of the user's media collection. The media library 120 may include any type of digital media consumable by the user including music, movies, pictures, digital books, audio, video, and/or other media.

The mobile computing device 100 further includes a communication circuit 114. The communication circuit 114 may be embodied as one or more devices and/or circuitry for enabling communications between the mobile computing device 100 and the remote search engine servers 150 over the network 160. The communication circuit 122 may be configured to use any one or more communication technology (e.g., wireless or wired communications) and associated protocols (e.g., Ethernet, Bluetooth®, Wi-Fi®, WiMAX, etc.) to effect such communication.

Additionally, in some embodiments, the mobile computing device 100 may further include one or more peripheral devices 124. Such peripheral devices 124 may include any type of peripheral device commonly found in a mobile computing device such as speakers, a hardware keyboard, input/output devices, peripheral communication devices, antennas, and/or other peripheral devices.

Each of the remote search engine servers 150 may be embodied as any type of server computing device, or collection of devices, capable of providing search functionality of the network 160 (e.g., capable of searching the Internet). As such, each remote search engine server 150 may be embodied as a single server computing device or a collection of servers and associated devices. For example, in some embodiments, each remote search engine server 150 is embodied as a cloud service to perform the search functionality. Each remote search engine server 150 may be operated by a different third-party search provider and, as such, may provide different search results based on the same search criteria.

Each remote search engine server 150 may include components and devices commonly found in a server computing including, for example, a processor, I/O subsystem, memory, data storage, and communication circuitry. Such components may be similar to the corresponding components of the mobile computing device 100, the description of which is applicable to the corresponding components each remote search engine server 150 and is not repeated herein so as not to obscure the present disclosure.

As discussed above, the mobile computing device 100 is configured to communicate with one or more of the remote search engine servers 150 over the network 160. The network 160 may be embodied as any type of network capable of facilitating communications between the mobile computing device 100, the one or more remote search engine servers 150, and other remote devices (e.g., remote computing devices or servers hosting content related to the media stored in the user's media library 120). In the illustrative embodiment, the network 160 is embodied as a publicly-accessible, global network such as the Internet. The network 160 may include any number of additional devices, such as additional remote hosts, computers, routers, and switches, to facilitate communications between the mobile computing device 100, the remote search engine servers 150, and other devices.

Figure 2:
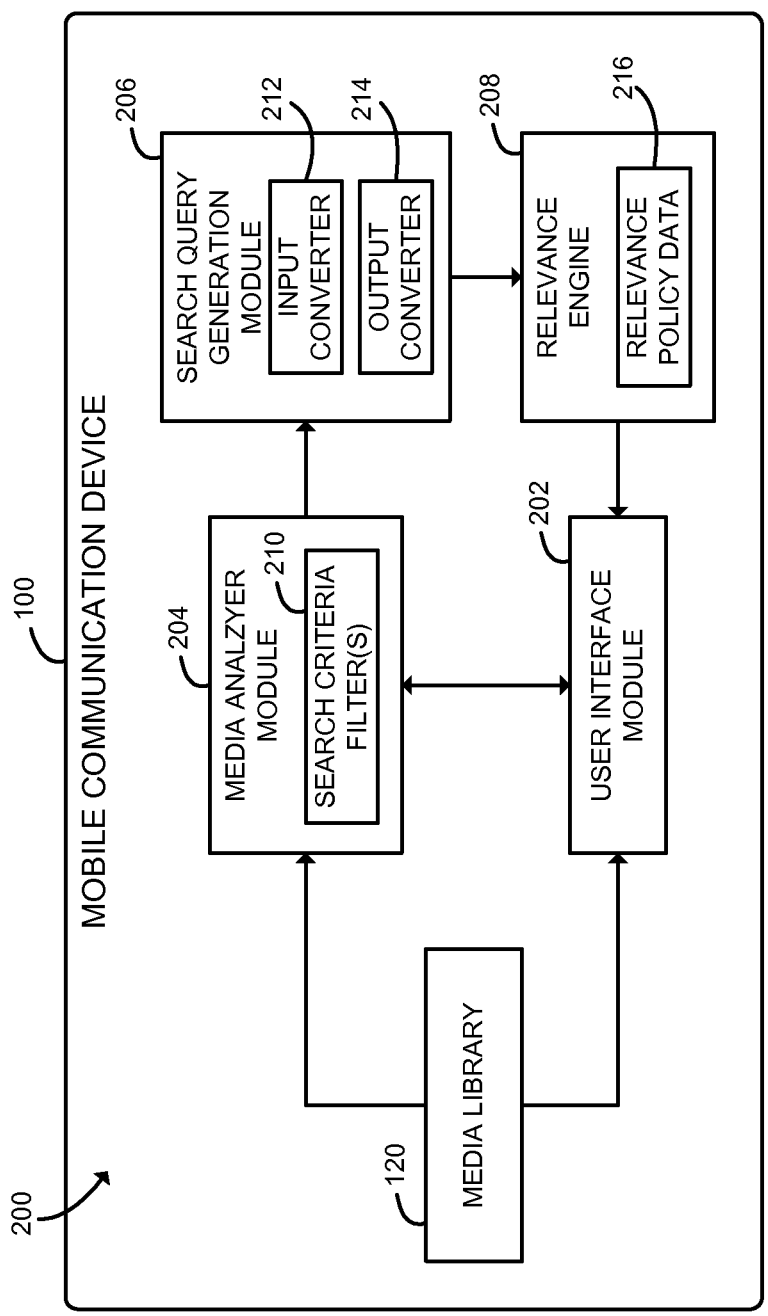
FIG. 2 is a simplified block diagram of at least one embodiment of an environment of a mobile computing device of the system of FIG. 1.

Referring now to FIG. 2, in the illustrative embodiment, the mobile computing device 100 establishes an environment 200 during operation. The illustrative environment 200 includes a user interface module 202, a media analyzer module 204, a search query generation module 206, and a relevance engine 208, each of which may be embodied as software, firmware, hardware, or a combination thereof. During use, the user interface module 202 monitors the user's interaction with media stored in the user's media library and provides the accessed media, metadata related to the accessed media, and/or other data related to the accessed media to the media analyzer module 204 for analysis. For example, if a user is listening to music from the media library 120, the user interface module 202 may retrieve the music from the media library 120 and provide the music (or a pointer thereto) to the media analyzer module 204. The supplied music may include metadata such as song title, artist, studio location, and other metadata, which may also be used by the media analyzer module 204. Additionally, in some embodiments, the user interface module 202 may provide further information related to the music or other media accessed by the user such as, for example, the current time in the song the user is listening to, the last time the user accessed that particular song, the last song listened to by the user, and/or other statistical and/or other data that may be used by the media analyzer module 204.

The media analyzer module 204 analyzes the media accessed by the user and other related data (e.g., metadata associated with the accessed media, historical user behavior data, etc.). To do so, the media analyzer module 204 may include one or more search criteria filters 210 configured to analyze the media and generate search criteria based thereon. The generated search criteria may include any amount of search criteria (e.g., one or more search terms), which may be embodied as any type of criteria usable by the search query generation module 206 to generate a search query as discussed in more detail below. For example, the search criteria may be embodied as textual data (e.g., search terms) such as a book or song title, author or performer's name, sample of the media (e.g., song lyrics or book quotation), and/or other data extracted or determined from the user-accessed media.

The search criteria filters 210 may be configured to analyze any portion of the accessed media or related data. For example, in some embodiments, a search criteria filter 210 may be configured to extract the song lyrics of a song, extract sentences or sections of a book, analyze video or images to generate search terms based thereon, extract identification data (e.g., song title, movie star, book publisher) of the accessed media from metadata associated with the media, access and/or monitor historical user behavior related to the media library 120 (e.g., which songs does the user listens to most, which books have the user read more than once, how often does the user listen to music, what type of movies or videos does the user watch the most, etc.), and/or generate and analyze statistical information about the media library 120 (e.g., relative percentage of music of a particular type, movies in which a particular actor starred, books by the same author, e.g.).

In some embodiments, the media analyzer module 204 may be configured to perform such analysis in response to the user actively accessing media from the user's media library (i.e., during "run time"). Additionally or alternatively, the media analyzer module 204 may perform such analysis continually, periodically, or otherwise as a background process disconnected from the user's current interaction with the medial library. For example, the media analyzer module 204 may periodically or continually analyze the media library to generate media statistics, which may be subsequently used to generate the search criteria. Such media statistics may be embodied as any statistical information of the media stored in the user's media library as discussed above.

The search query generation module 206 receives the search criteria generated by the media analyzer module 204 and generates a search query based on the search criteria. The search query is subsequently submitted to one or more remote search engine servers 150. To do so, the search query generation module 206 may utilize one or more input converters 212 to convert the search criteria to a suitable format accepted by each remote search engine server 150. For example, the search criteria may be embodied as search terms. However, some remote search engine servers 150 may not accept textual input or may only accept a search query configured to a specific format. In such embodiments, the search query generation module 206 utilizes the input converter 212 to convert the search criteria to a search query acceptable to the remote search engine server 150. For example, if the remote search engine server 150 only accepts searches selected from a menu of options, the input converter 212 may convert a textual search criteria to one or more options of the menu and submit such selected options to the remote search engine server 150. In embodiments in which the remote search engine server 150 includes an application program interface (API) or other software interface, the input converter 212 may utilize such interface to facilitate the submission of the search query.

The search query generation module 206 also receives the search results from each of the remote search engine servers 150. The search results may be provided from the remote search engine servers 150 in any format. As such, the search query generation module 206 may utilize one or more output converters 214 to convert the received search results to a common format or a format otherwise usable by the relevance engine 208 as discussed below. Additionally, in some embodiments, the search query generation module 206 may perform subsequent or refined searches based on the search results. In this way, the searching performed by the search query generation module 206 may be iterative or recursive in nature.

The relevance engine 208 receives the search results from the search query generation module 206 and filters the search results to determine those search results that are relevant to the user and/or the media access by the user. To do so, the relevance engine 208 may utilize relevance policy data 216 to determine relevant search results. The relevance policy data 216 may be stored in the data storage 112 and may include any type of data usable by the relevance engine 208 to determine a relevancy of the search results. For example, the relevance policy data 216 may include user preference data (e.g., the user's likes/dislikes), user behavior data (e.g., what type of search results has the user previously found helpful), statistical information related to the media stored in the media library 120, other ranking data obtained from third-party sources, and/or other data usable to determine which results are relevant to the user. As such, the relevance policy data 216 may include pre-established policy data or policy data generated during execution (e.g., generated during compile or run time). In some embodiments, the search results may include data, such as metadata, that may be used as policy data to determine the relevancy of the search result (e.g., certain third-party search entities may be determined to deliver more relevant search results).

The relevance engine 208 may employ any type and number of analysis algorithms to determine the relevancy of the search results and may discard those search results deemed to be non-relevant. The relevance engine 208 provides the determined relevant search results to the user interface module 202. The user interface module 202 subsequently displays the relevant search results to the user on the display 110. In some embodiments, the relevant search results are displayed in association with the accessed media used to generate the search results. For example, as discussed in more detail below in regard to FIGS. 4-6, the relevant search results may be displayed adjacent the accessed media so that the user may review the search results and interact therewith (e.g., select one of the search results for more information).

Figure 3:
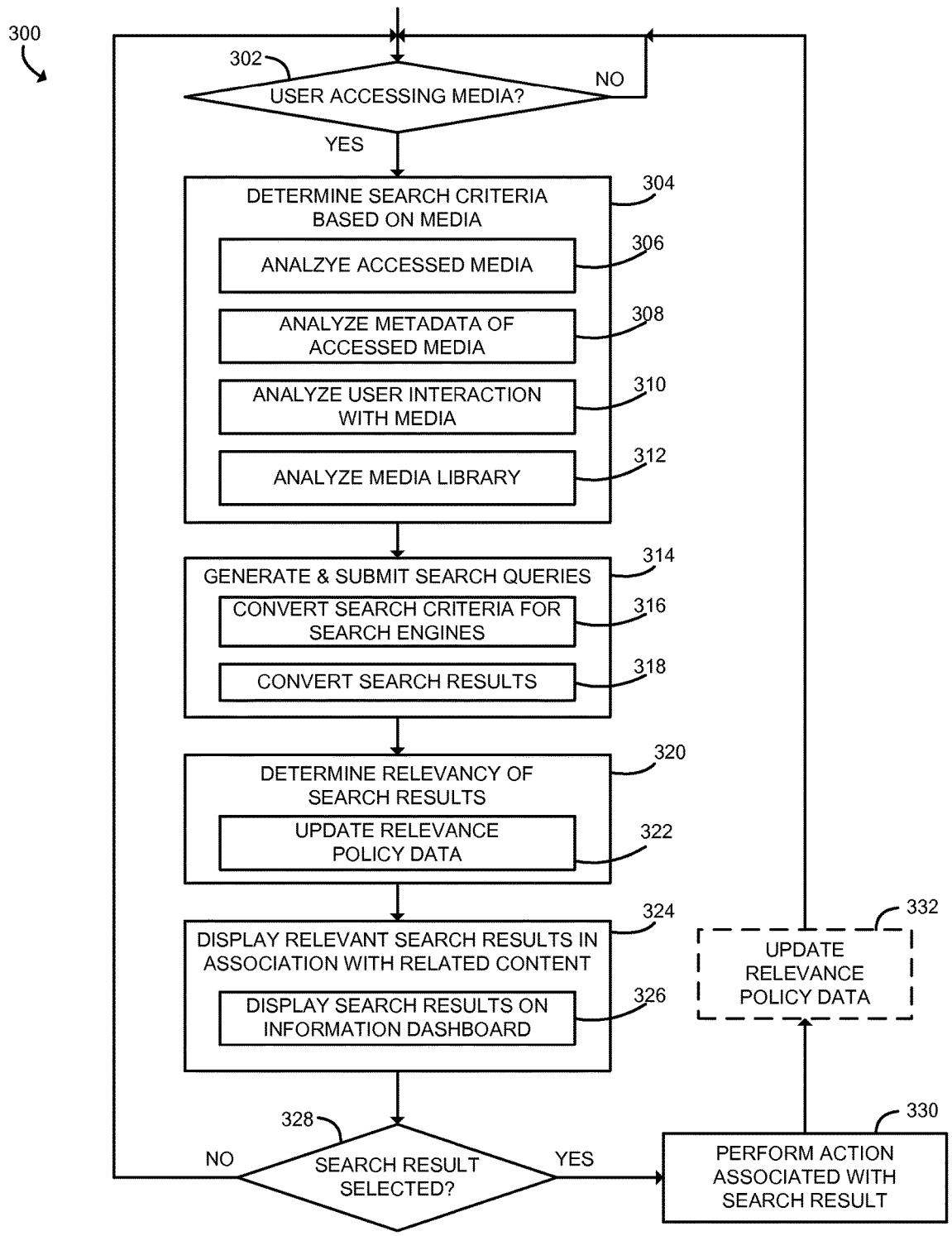
FIG. 3 is a simplified flow diagram of at least one embodiment of method for generating and displaying media search results on a display of the mobile computing device of FIG. 2.

Referring now to FIG. 3, in use, the mobile computing device 100 may execute a method 300 for generating and displaying media search results on the display 110 of the mobile computing device 100. The method 300 begins with block 302 in which the user interface module 202 monitors for the user's access of the media stored in the media library 120. In some embodiments, the user may directly interact with the user interface module 202 (e.g., via a suitable graphical user interface) to access the media. However, in other embodiments, the user may utilize a media application, such as a music player or digital book reader application, to access the media. In such embodiments, the user interface module 202 may monitor those applications for access to the media stored in the media library 120.

If the user interface module 202 determines that the user has accessed media stored in the media library 120, the method 300 advances to block 308 in which the media analyzer module 204 determines search criteria based on the accessed media and/or other criteria. To do so, the user interface module 202 may retrieve the access media and provide the media to the media analyzer module 204 for analysis. Alternatively, the user interface module 202 may provide an identifier of the accessed media to the media analyzer module 204, which may subsequently access the media to perform the analysis thereof. Regardless, the media analyzer module 204 performs one or more analysis functions on the accessed media, the media stored in the media library 120, the user's preference and/or media consumption history, data from remote sources regarding the media, and/or other data.

As discussed above, the media analyzer module 204 may utilize one or more search criteria filters 210 to analyze the accessed media and generate search criteria based thereon. The search criteria filters 210 may analyze any portion or aspect of the accessed media and may extract, or otherwise generate, search criteria based on such portion or aspect. The search criteria filters 210 may perform any type of analysis of the accessed media to generate the search criteria including, but not limited to, extraction of search criteria data from the accessed media, statistical data based on the accessed media, third-party analysis of the accessed media, and/or other analysis procedures and processes. For example, in some embodiments, the media analyzer module 204 may extract song lyrics from music, sentences or quotations from digital books, images from video, and/or other data capable of being extracted from, or otherwise determined from, the accessed media. Such extracted data may be sued by the media analyzer module 204 as the search criteria (e.g., song lyrics, book quotes, etc.). Additionally or alternatively, the media analyzer module 204 may determine the search criteria based on the extracted data. For example, the media analyzer module 204 may extract images from a digital movie accessed on the mobile computing device 100 and subsequently determine the name of an actor present in the extracted image. In such embodiments, the name of the actor may be used as the search criteria. In this way, the media analyzer module 204 may perform multiple analysis processes on the accessed media to generate multiple search criteria based thereon.

The media analyzer module 204 may also analyze metadata associated with the accessed media in block 308. Such metadata may be embodied as any data about or related to the accessed media. In some embodiments, the metadata may be attached to, or otherwise encapsulated in, the accessed media. Alternatively, in some embodiments, the metadata may be provided to the media analyzer module 204 by the user interface module 202. The media analyzer module 204 may analyze the metadata to generate or refine search criteria. For example, the media analyzer module 204 may extract or determine identification data of the accessed media such as the song, book, or movie title of the accessed media; the name of a movie actor in the accessed media; the publisher of the accessed media; the publication date of the media; author of the media; and/or other identification or other data related to the accessed media.

The media analyzer module 204 may additionally analyze the user's interaction with the media in block 310. Such analyzed interaction may include the user's interaction with the particular media currently being accessed (e.g., number of times the media has been accessed, last time the media has been accessed, etc.) and/or the user's interaction with the media library 120 (e.g., which song or book is accessed the most, which song or book has been accessed more than once, how often does the user listen to music or read, etc.). That is, the media analyzer module 204 may analyze the user's current and historical behavior related to the media stored in the media library 120. In some embodiments, data related to the user's interaction with the accessed media may be provided to the media analyzer module 204 by the user interface module 202 such as, for example, the user's current location within the media, the last time the user accessed the particular media, the average use time of the accessed media by the user, and other user interaction data. Additionally or alternatively, the media analyzer module 204 may monitor and record the user's interaction with the media library 120. In this way, the media analyzer module 204 may utilize various current and historical user behavior data to generate or refine the search criteria.

The media analyzer module 204 may also analyze the media library 120 to determine or refine the search criteria in block 312. That is, the media analyzer module 204 may generate and analyze statistical information regarding the media stored in the media library 120 and determine or refine search criteria based on the statistical information. Such statistical information may be embodied as any statistical information about the media library 120 useful in generating search criteria. For example, the statistical information may include the relative percentage of the various types of media, the relative percentage of media authored by the same person(s), the number of the various types of media, the date of the last media purchase, and/or other statistical information related to the media library 120.

Of course, it should be appreciated that the media analyzer module 204 may utilize other data and/or analysis processes to determine or refine the search criteria. Additionally, multiple analysis procedures may be used to generate a single search criteria. Further, the analyses discussed above in regard to blocks 306-312 may occur upon the user's access of media stored in the media library 120 and/or continually as a background process as discussed above. As such, the media analyzer module 204 may utilize a plethora of media and user behavior analysis procedures to generate one or more search criteria.

After the media analyzer module 204 has generated the search criteria, the media analyzer module 204 provides the generated search criteria to the search query generation module 206. The search query generation module 206 generates one or more search queries based on the search criteria and submits the search queries to one or more of the remote search engine servers 150 in block 314. To do so, the search query generation module 206 may convert the search criteria generated in block 304 to a suitable format accepted by each remote search engine server 150 using one or more of the input converters 212 in block 316. As discussed above, the input converters 212 may utilize any algorithm or function to convert the search criteria to the accepted format including, for example, converting textual search criteria to graphical search criteria (e.g., selection of a menu button, etc.). Additionally or alternatively, the search query generation module 206 may utilize an API or other software interface of one or more of the remote search engine servers 150 to submit the search queries.

The search query generation module 206 may also convert any search results received from the remote search engine servers 150 in block 318. The search results may be embodied as any type of data received as a function of the search criteria including, but not limited to, textual data, images, video, links to other websites or data, audio data such as music, and/or other data generally generated in response to a typical web search. As discussed above, the search query generation module 206 may use the output converters 214 to convert the received search results, which may be received in various formats, to a common or pre-defined format that is usable by the relevance engine 208. Additionally, it should be appreciated that in some embodiments, the search query generation module 206 may perform further, refined searches based on the received search results in block 314.

In block 320, the relevance engine 208 filters the search results received from the search query generation module 206 to determine which results are relevant to the user and/or the media currently accessed by the user. As discussed above, the relevance engine 208 may utilize any type and number of analysis algorithms or functions to determine the relevancy of the search results. To do so, in some embodiments, the relevance engine 208 may compare the search results to the relevance policy data 216 to determine which search results should be kept and which should be discarded. As discussed above, the relevance policy data 216 may include any type of data useable by the relevance engine 208 to determine the relevancy of search results including, but not limited to, user preference data, user behavior data, statistical information related to the media stored in the media library 120, other ranking data obtained from third-party sources, and/or other data usable to determine which results are relevant to the user. The relevance policy data 216 may be pre-generated or may be accumulated "as needed" upon receiving the search results. For example, in some embodiments, the relevance engine 208 may access third-party ranking data of the server from which the search results were obtained or the like. Additionally, in some embodiments, the relevance policy data 216 may be updated based on the determined relevance of the search results and/or other data (e.g., the user's behavior in regard to the search results) in block 322.

Figure 4:
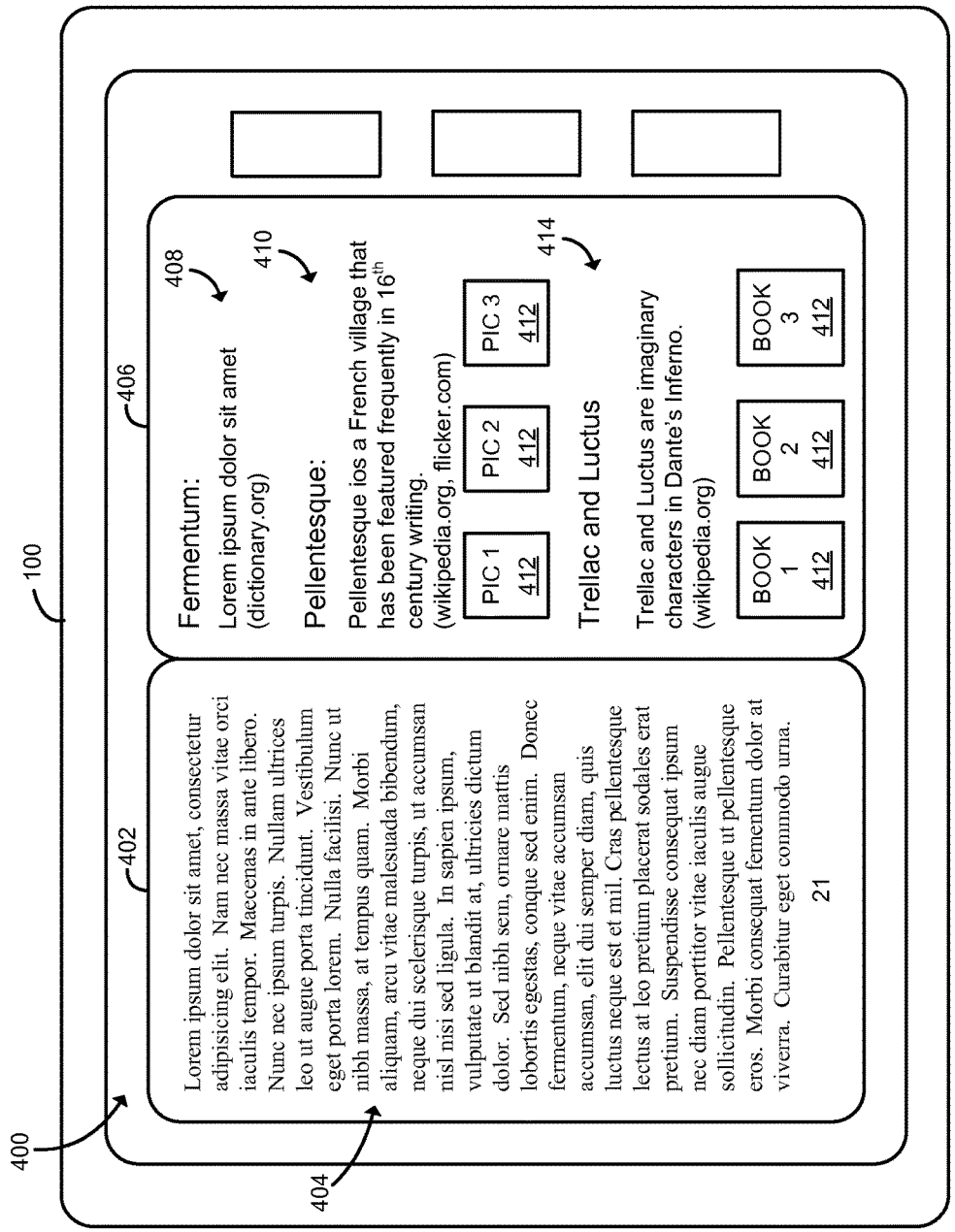
FIG. 4 is a simplified illustration of at least one embodiment of a media search result that may be generated by the method of FIG. 3 and displayed on the display of the mobile computing device of FIG. 2.
Figure 5:
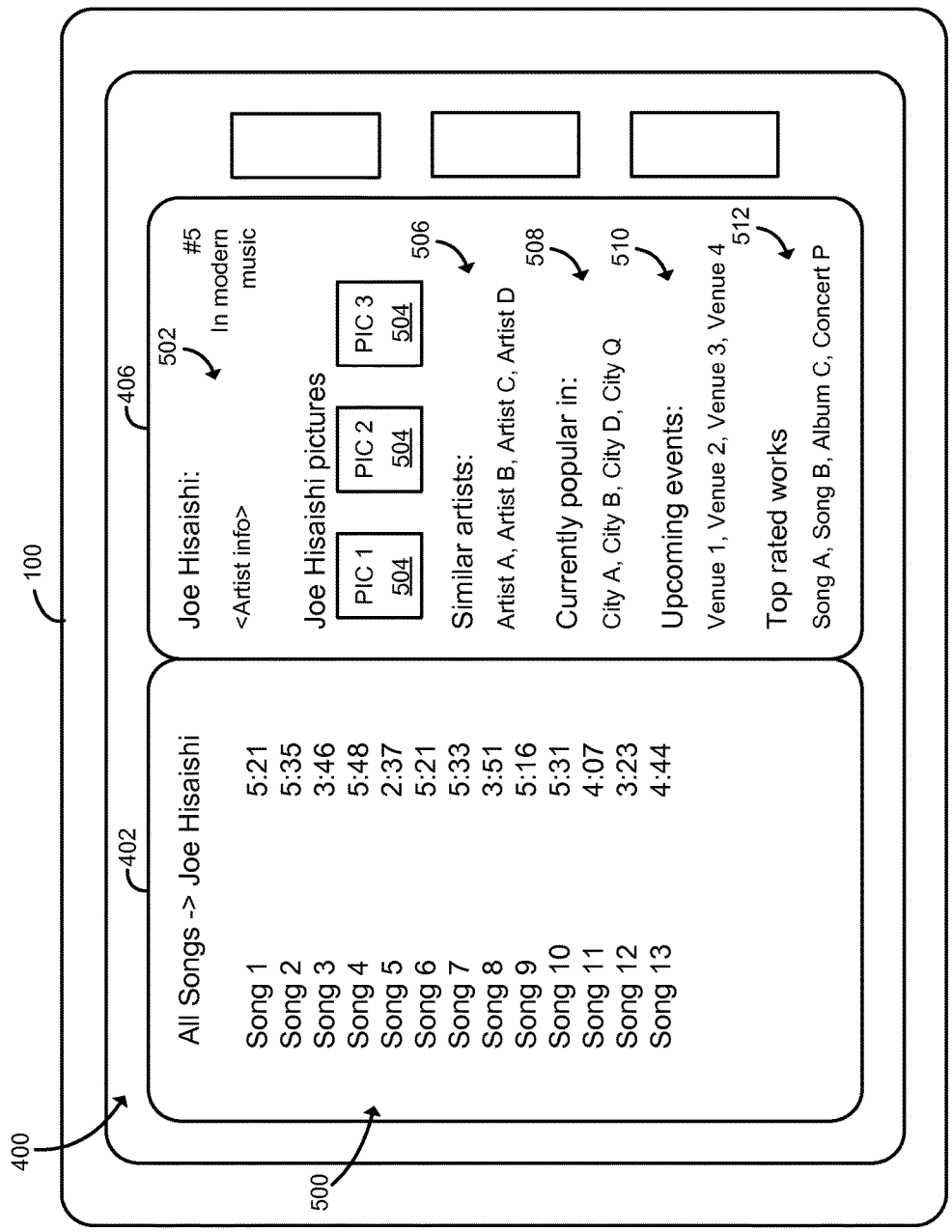
FIG. 5 is a simplified illustration of at least one embodiment of another media search result that may be generated by the method of FIG. 3 and displayed on the display of the mobile computing device of FIG. 2.

The relevance engine 208 provides those search results determined to be relevant to the user interface module 202, which displays the relevant search results to the user in block 324. In the illustrative embodiment, the relevant search results are displayed in association with the accessed media such that the displayed search results and the presently accessed media are related to each other. For example, in block 326, the relevant search results may be displayed on an information dashboard, which may form part of the graphical user interface used to access the media. One illustrative user interface 400 that may be displayed on the display 110 of the mobile computing device 100 during execution of the method 300 is shown in FIG. 4. The user interface 400 includes a media pane 402 in which the accessed media 404 is displayed, which is illustratively a digital book in FIG. 4. The user interface 400 also include a search results dashboard 406 in which the relevant search results are displayed. As shown in FIG. 4, the displayed, relevant search results may include various types of search result data such as a dictionary definition 408 of a term found in the accessed media 404, background information 410 and associated images 412 of a location discussed in the accessed media 404, and character information 414 of various characters mention in the accessed media 404. Additionally, several further digital books 416, which may relate to the accessed media 404, or to one or more of the other search results (e.g., the background information 410 or the character information 414) are displayed toward the bottom of the search results dashboard 406.

In the illustrative embodiment of FIG. 4, each search result includes identification of the website or other online location from which the search results were obtained. Additionally, the search results are aggregated with similar search results (e.g., the images 412 associated with the background information 410 are displayed in associated with each other although each image may have been obtained from a different online location and/or remote search engine server 150). Some of the search results may be displayed as links to other media, websites, or online locations. For example, in some embodiments, each of the digital books 416 may be displayed as a web link of the associated digital book 416, which may be selected by the user of the mobile computing device 100 to be directed to an online website from which the user may purchase or review the associated digital book 416. Further, it should be appreciated that, in some embodiments, some of the search results may be generated, or otherwise obtained, from the user's own media library 120. For example, one or more of the digital books 416 may be a link to a digital book currently owned by the user and located in the user's media library 120, which is related to the currently accessed media displayed in the media pane 402.

Of course, other types of search results may be displayed to the user based on the type of media currently accessed. For example, in FIG. 5, the user has accessed a digital album stored in the user's media library 120. A song list 500 of the digital album is displayed in the media pane 402 and relevant search results generated by execution of the method 300 are displayed in the search results dashboard 406. In the illustrative embodiment of FIG. 5, the relevant search results include artist information 502, artist pictures 504, an identification or recommendation list 506 of other artists, a popularity list 508 based on location, an upcoming event list 510, and a top rated works list 512. Of course, additional or other relevant search results may be generated and displayed in other embodiments. As discussed above, some of the displayed search results may be determined to be relevant based on the accessed media (e.g., the artist pictures 504 or recommendation list 506), while other search results are determined to be relevant based on the user and/or user behavior (e.g., the upcoming event list 510 may include only those locations near the user). Additionally, as discussed above, some of the search results may link to other online locations. For example, each venue displayed in the upcoming event list 510 may be displayed as a link to a ticket purchase website to allow the user to quickly purchase tickets for the displayed event.

Figure 6:
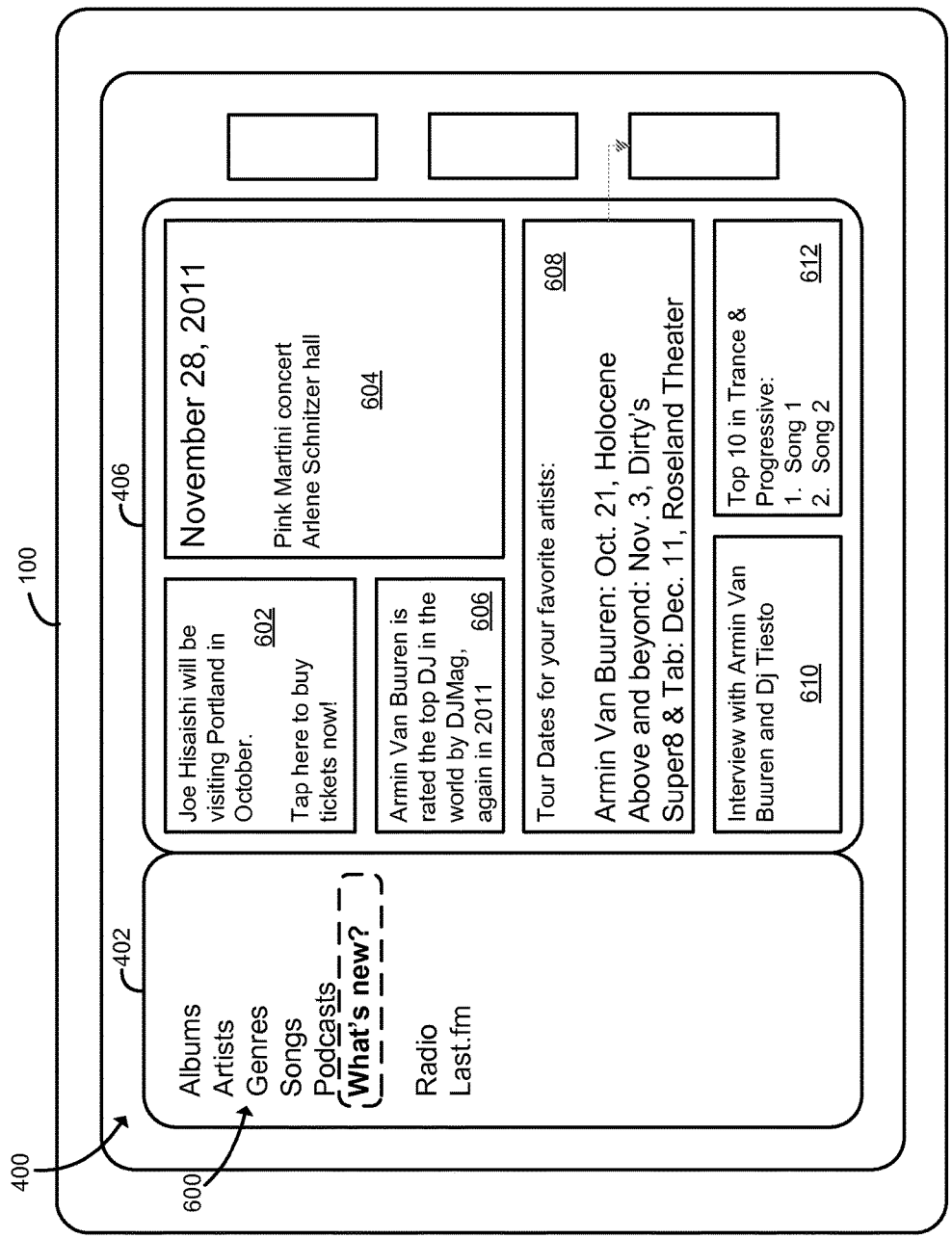
FIG. 6 is a simplified illustration of at least one embodiment of another media search result that may be generated by the method of FIG. 3 and displayed on the display of the mobile computing device of FIG. 2.

As discussed above, the search criteria may also be generated based on the media collection of the user stored in the media library 120. For example, as shown in FIG. 6, a media player 600 is displayed in the media pane 402 along with various information relevant to the user's media collection, which is displayed in the search results dashboard 406. Such information may include any type of information relevant to the media stored in the media collection and/or the user's preference/behavior. In the illustrative embodiment of FIG. 6, for example, the relevant information includes a local concert announcement 602 with links to purchase tickets, another local concert announcement 604 occurring later in time, a rating update 606 regarding an artist included in the user's media collection, tour date information 608 for various artists included in the user's media collection, news information 610 regarding artists included in the user's media collection, and ranking data 612 regarding various media included in the user's media collection. As discussed above, some the search results may link to other online locations such as, for example, the local concert announcement 602, which may be selected by the user to purchase tickets for the displayed event.

Referring back to FIG. 3, after the relevant search results have been displayed to the user in block 324, the mobile computing device 100 determines whether the user has selected any of the search results (i.e., those search results that are linked to other media, websites, or other online locations) in block 328. If not, the method 300 loops back to block 302 in which the user interface module 202 monitors for the user's access of additional media stored in the media library 120. However, if the user has selected one of the selectable, displayed search results, the method 300 advances to block 330. In block 330, the mobile computing device 100 performs any action that may be associated with the selected search result. For example, as discussed above, some search results may be displayed as links to other media stored in the user's media library 120 or to websites or other online locations. As such, in response to the user selecting the associated search result, the mobile computing device 100 may retrieve and display the linked media and/or website in block 330.

In some embodiments, the relevance engine 208 may update the relevance policy data 216 based on the user's interaction with the displayed search results in block 332. For example, if the user selected one or more of the linked search results, such selections may be stored in the relevance policy data 216 as an indication of the user's preference or refinement thereof. The method 300 subsequently loops back to block 302 in which the user interface module 202 monitors for the user's access of additional media stored in the media library 120.

It should be appreciated that the relevant search results displayed during the execution of the method 300 may be updated or modified as the user consumes the media. For example, as the user turns each page of a digital book, additional search criteria may be generated and result in the display of different relevant search results. Similarly, as the user accesses a different song, different or additional relevant search results may be displayed to the user based on the currently accessed song. As such, it should be appreciated that the system, devices, methods, and other technologies disclosed herein facilitate an automated search based on media accessed by the user, the user's historical behavior/preference, and/or the media stored in the user's media library and display of the relevant search results to the user in association with the accessed media.

EXAMPLES

Illustrative examples of the devices, systems, and methods disclosed herein are provided below. An embodiment of the devices, systems, and methods may include any one or more, and any combination of, the examples described below.

Example 1 includes a computing device for generating and displaying media search results. The computing device includes a data storage having stored therein a media library of media for consumption by a user of the computing device; a media analyzer module to determine a search criteria based on media of the media library; a search query generation module to (i) generate a search query as a function of the search criteria, (ii) submit the search query to a remote search engine, and (iii) receive a plurality of search results from the remote search engine; a relevance engine to determine a relevancy of each search result as a function of relevance policy data stored in the data storage; and a user interface module to display at least one relevant search result on a display of the computing device in response to the relevance engine determining that the at least one search result is relevant.

Example 2 includes the subject matter of Example 1, and wherein the media analyzer module comprises a media analyzer to determine the search criteria without direction from the user of the computing device.

Example 3 includes the subject matter of any of Examples 1 and 2, and wherein the user interface module is to access media of the media library in response to a request received from the user; and the media analyzer module comprises a media analyzer to generate search criteria as a function of the content of the accessed media.

Example 4 includes the subject matter of any of Examples 1-3, and wherein the user interface module is to access media of the media library in response to a request received from the user; and the media analyzer module comprises a media analyzer to generate search criteria as a function of metadata of the accessed media.

Example 5 includes the subject matter of any of Examples 1-4, and wherein the media analyzer module comprises a media analyzer to generate search criteria as a function of an interaction by the user with the media library.

Example 6 includes the subject matter of any of Examples 1-5, and wherein the user interface module is to access media of the media library in response to a request received from the user; and the media analyzer module comprises a media analyzer to generate search criteria as a function of an interaction by the user with the accessed media.

Example 7 includes the subject matter of any of Examples 1-6, and wherein the media analyzer module comprises a media analyzer to analyze the media library and to generate search criteria as a function of the analysis of the media library.

Example 8 includes the subject matter of any of Examples 1-7, and wherein the media analyzer module comprises a media analyzer to generate search criteria as a function of the media of the media library.

Example 9 includes the subject matter of any of Examples 1-8, and wherein the search query generation module is to convert the search criteria to a format acceptable by the remote search engine.

Example 10 includes the subject matter of any of Examples 1-9, and wherein the search query generation module comprises a search query generation module to generate a plurality of search queries; and submit each search query to a different remote search engine.

Example 11 includes the subject matter of any of Examples 1-10, and wherein the relevance engine comprises a relevance engine to determine the relevancy of each search result as a function of a historical media consumption of the user of the computing device.

Example 12 includes the subject matter of any of Examples 1-11, and wherein the relevance engine comprises a relevance engine to generate statistical data as a function of the media of the media library; and determine the relevancy of each search result as a function of the statistical data.

Example 13 includes the subject matter of any of Examples 1-12, and wherein the relevance engine comprises a relevance engine to access an online ranking resource as a function of the search result to retrieve relevancy data; and determine the relevancy of each search result as a function of the relevancy data retrieved from the online ranking resource.

Example 14 includes the subject matter of any of Examples 1-13, and wherein the user interface module is further to receive a selection, by the user, of one of the displayed relevant search results, and perform an action on the computing device as a function of the selected search result.

Example 15 includes the subject matter of any of Examples 1-14, and wherein the user interface module is to cause the computing device to access a website associated with the search result in response to the selection of the displayed relevant search result by the user.

Example 16 includes the subject matter of any of Examples 1-15, and wherein the relevance policy data is stored in the data storage, and the relevance engine is to update the relevance policy data a function of the user's selection of the search result.

Example 17 includes a method for generating and displaying media search results on a computing device. The method includes determining, on the computing device, search criteria based on media stored on the computing device; generating, on the computing device, a search query as a function of the search criteria; submitting the search query to a remote search engine; receiving, on the computing device, a plurality of search results from the remote search engine in response to the search query; determining, on the computing device, a relevancy of each search result as a function of relevance policy data stored on the computing device; and displaying at least one relevant search result on a display of the computing device.

Example 18 includes the subject matter of Example 17, and wherein determining the search criteria comprises determining the search criteria without direction from a user of the computing device.

Example 19 includes the subject matter of any of Examples 17 and 18, and further including accessing media stored on the computing device in response to a request received from a user of the computing device; and wherein determining search criteria comprises generating search criteria as a function of the content of the accessed media.

Example 20 includes the subject matter of any of Examples 17-19, and further including accessing media stored on the computing device in response to a request received from a user of the computing device; and wherein determining search criteria comprises generating search criteria as a function of metadata of the accessed media.

Example 21 includes the subject matter of any of Examples 17-20, and wherein determining search criteria comprises generating search criteria as a function of a user's interaction with a media library stored on the computing device.

Example 22 includes the subject matter of any of Examples 17-21, and further including accessing media stored on in the media library in response to a request received from the user of the computing device; and wherein generating search criteria comprises generating search criteria as a function of the user's interaction with the accessed media.

Example 23 includes the subject matter of any of Examples 17-22, and wherein determining search criteria comprises analyzing a media library stored on the computing device and generating search criteria as a function of the analysis of the medial library.

Example 24 includes the subject matter of any of Examples 17-23, and wherein generating search criteria comprises generating search criteria as a function of the media.

Example 25 includes the subject matter of any of Examples 17-24, and wherein generating a search query comprises converting the search criteria to a format acceptable by the remote search engine.

Example 26 includes the subject matter of any of Examples 17-25, and wherein generating a search query comprise generating a plurality of search queries; and submitting the search query comprises submitting each search query to a different remote search engine.

Example 27 includes the subject matter of any of Examples 17-26, and wherein determining the relevancy of each search result comprises determining the relevancy of each search result as a function of a historical media consumption of a user of the computing device.

Example 28 includes the subject matter of any of Examples 17-27, and wherein determining the relevancy of each search result comprises generating statistical data as a function of a media library stored on the computing device; and determining the relevancy of each search result as a function of the statistical data.

Example 29 includes the subject matter of any of Examples 17-28, and wherein determining the relevancy of each search result comprises accessing an online ranking resource as a function of the search result to retrieve relevancy data; and determining the relevancy of each search result as a function of the relevancy data retrieved from the online ranking resource.

Example 30 includes the subject matter of any of Examples 17-29, and further including receiving a selection, by a user of the computing device, of one of the displayed search results, and performing, on the computing device, an action associated with the selected search result.

Example 31 includes the subject matter of any of Examples 17-30, and wherein performing the action associated with the selected search result comprises accessing a website associated with the search result.

Example 32 includes the subject matter of any of Examples 17-31, and further including updating the relevance policy data as a function of the user's selection of the search result.

Example 33 includes a computing device including a processor; and a memory having stored therein a plurality of instructions that when executed by the processor cause the computing device to perform the method of any of Examples 17-32.

Example 36 includes one or more machine readable storage media comprising a plurality of instructions stored thereon that in response to being executed result in a computing device performing the method of any of Examples 17-32.

The invention claimed is:

1. A computing device for generating and displaying media search results, the computing device comprising:
a data storage having stored therein a media library of media for consumption by a user of the computing device; and
one or more processors to implement:
a media analyzer module to determine a search criteria based on an accessed media of the media library and based on a present geographic location of the user of the computing device, wherein the accessed media is of a first media type;
a search query generation module to (i) generate a search query as a function of the search criteria, (ii) convert the search query from a first query format to a second query format that is associated with a first remote search engine and to a third query format that is associated with a second remote search engine; (iii) submit the search query to at least the first remote search engine in the second query format and the second remote search engine in the third query format, and (iv) receive a plurality of search results from at least the first remote search engine and the second remote search engine;
a relevance engine to determine whether each search result is relevant as a function of relevance policy data stored in the data storage; and
a user interface module to display at least one search result on a display of the computing device in response to the relevance engine determining that the at least one search result is relevant, wherein the at least one search result is of a second media type different from the first media type and pertains to the present geographic location of the user of the computing device.

2. The computing device of claim 1, wherein the media analyzer module comprises a media analyzer to determine the search criteria without direction from the user of the computing device.

3. The computing device of claim 1, wherein the user interface module is to access media of the media library in response to a request received from the user; and
the media analyzer module comprises a media analyzer to generate search criteria as a function of the content of the accessed media.

4. The computing device of claim 1, wherein the user interface module is to access media of the media library in response to a request received from the user; and
the media analyzer module comprises a media analyzer to generate search criteria as a function of metadata of the accessed media.

5. The computing device of claim 1, wherein the media analyzer module comprises a media analyzer to generate search criteria as a function of an interaction by the user with the media library.

6. The computing device of claim 1, wherein the media analyzer module comprises a media analyzer to analyze the media library and to generate search criteria as a function of the analysis of the media library.

7. The computing device of claim 1, wherein the search query generation module comprises a search query generation module to:
convert the search query from a text query format to a graphical query format that is associated with the first remote search engine.

8. The computing device of claim 1, wherein the search query generation module comprises a search query generation module to:
receive first search results from the first remote search engine in a first results format;
receive second search results from the second remote search engine in a second results format; and
convert the first search results and the second search results to a third results format that is associated with the relevance engine.

9. The computing device of claim 1, wherein the relevance engine comprises a relevance engine to:
generate statistical data as a function of the media of the media library; and
determine the relevancy of each search result as a function of the statistical data.

10. The computing device of claim 1, wherein the relevance engine comprises a relevance engine to:
access an online ranking resource as a function of the search result to retrieve relevancy data; and
determine the relevancy of each search result as a function of the relevancy data retrieved from the online ranking resource.

11. The computing device of claim 1, wherein the user interface module is further to:
receive a selection, by the user, of one of the displayed relevant search results, and
perform an action on the computing device as a function of the selected search result.

12. The computing device of claim 1, wherein the first media type is a song and the second media type is a concert.

13. The computing device of claim 1, wherein the relevance engine is further to determine a relevance of the at least one search result based on a comparison of the present geographic location associated with the user and a geographic location associated with the at least one search result.

14. The computing device of claim 1, wherein the relevance engine is further to determine that the first remote search engine provides more relevant search results than the second remote search engine based on an analysis of metadata included in the search results from the first remote search engine and the second remote search engine.

15. A method for generating and displaying media search results on a computing device, the method comprising:
    determining, on the computing device, search criteria based on an accessed media stored on the computing device library and based on a present geographic location of a user of the computing device, wherein the accessed media is of a first media type;
    generating, on the computing device, a search query as a function of the search criteria;
    converting the search query from a first query format to a second query format that is associated with a first remote search engine and to a third query format that is associated with a second remote search engine;
    submitting the search query to at least the first remote search engine in the second query format and the second remote search engine in the third query format;
    receiving, on the computing device, a plurality of search results from at least the first remote search engine and the second remote search engine in response to the search query;
    determining, on the computing device, whether each search result is relevant as a function of relevance policy data stored on the computing device; and
    displaying at least one search result on a display of the computing device in response to determining that the at least one search result is relevant, wherein the at least one search result is of a second media type different from the first media type and pertains to the present geographic location of the user of the computing device.

16. The method of claim 15, wherein determining the search criteria comprises determining the search criteria without direction from the user of the computing device.

17. The method of claim 15, further comprising accessing media stored on the computing device in response to a request received from the user of the computing device; and
    wherein determining search criteria comprises generating search criteria as a function of at least one of: the content of the accessed media or metadata of the accessed media.

18. The method of claim 15, wherein determining search criteria comprises generating search criteria as a function of the user's interaction with a media library stored on the computing device.

19. The method of claim 15, wherein determining search criteria comprises analyzing a media library stored on the computing device and generating search criteria as a function of the analysis of the medial library.

20. The method of claim 15, wherein determining the relevancy of each search result comprises determining the relevancy of each search result as a function of a historical media consumption of a user of the computing device.

21. The method of claim 15, wherein determining the relevancy of each search result comprises:
    generating statistical data as a function of a media library stored on the computing device; and
    determining the relevancy of each search result as a function of the statistical data.

22. The method of claim 15, wherein determining the relevancy of each search result comprises:
    accessing an online ranking resource as a function of the search result to retrieve relevancy data; and
    determining the relevancy of each search result as a function of the relevancy data retrieved from the online ranking resource.

23. The method of claim 15, further comprising:
    receiving a selection, by the user of the computing device, of one of the displayed search results, and
    performing, on the computing device, an action associated with the selected search result.

24. One or more non-transitory, machine readable storage media comprising a plurality of instructions stored thereon that in response to being executed result in a computing device:
    determining, on the computing device, search criteria based on an accessed media stored on the computing device library and based on a present geographic location of a user of the computing device, wherein the accessed media is of a first media type;
    generating, on the computing device, a search query as a function of the search criteria;
    converting, on the search engine, the search query from a first query format to a second query format that is associated with a first remote search engine and to a third query format that is associated with a second remote search engine;
    submitting the search query to at least the first remote search engine in the second query format and the second remote search engine in the third query format;
    receiving, on the computing device, a plurality of search results from at least the first remote search engine and the second remote search engine in response to the search query;
    determining, on the computing device, whether each search result is relevant as a function of relevance policy data stored on the computing device; and
    displaying at least one search result on a display of the computing device in response to determining that the at least one search result is relevant, wherein the at least one search result is of a second media type different from the first media type and pertains to the present geographic location of the user of the computing device.

25. The one or more non-transitory, machine readable storage media of claim 24, wherein determining the search criteria comprises determining the search criteria without direction from the user of the computing device.

26. The one or more non-transitory, machine readable storage media of claim 24, wherein the plurality of instructions, in response to being executed, further result in the computing device accessing media stored on the computing device in response to a request received from the user of the computing device; and
    wherein determining search criteria comprises generating search criteria as a function of at least one of: the content of the accessed media or metadata of the accessed media.

27. The one or more non-transitory, machine readable storage media of claim 24, wherein determining search criteria comprises generating search criteria as a function of the user's interaction with a media library stored on the computing device.

28. The one or more non-transitory, machine readable storage media of claim 24, wherein determining search criteria comprises analyzing a media library stored on the computing device and generating search criteria as a function of the analysis of the medial library.

29. The one or more non-transitory, machine readable storage media of claim 24, wherein determining the relevancy of each search result comprises determining the relevancy of each search result as a function of a historical media consumption of the user of the computing device.

* * * * *